Jan. 22, 1957 F. L. JOHANNES 2,778,438
POWER TRANSMITTING ATTACHMENT FOR VEHICLES
Filed May 12, 1954 3 Sheets-Sheet 2
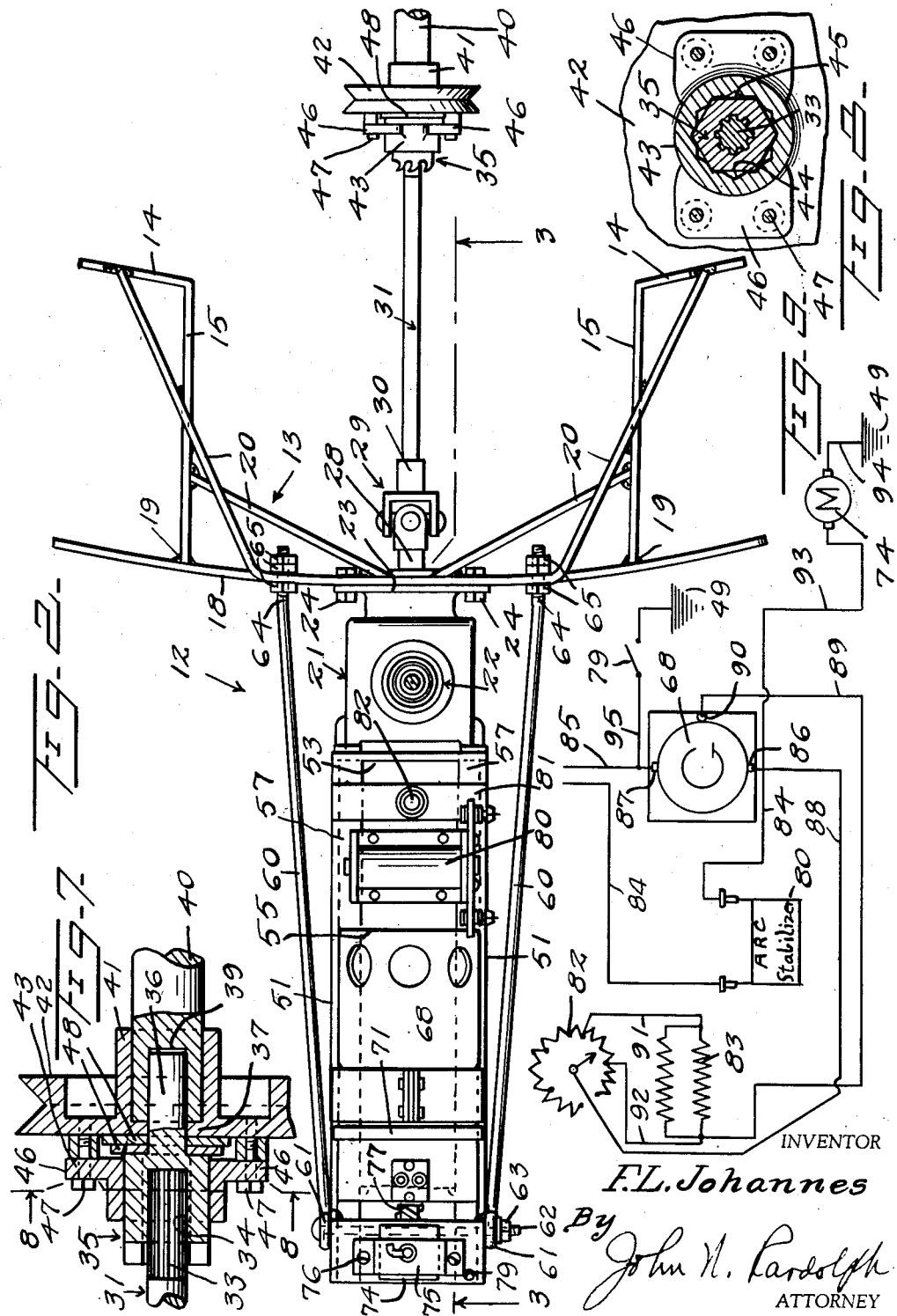
INVENTOR
F. L. Johannes
By John N. Randolph
ATTORNEY

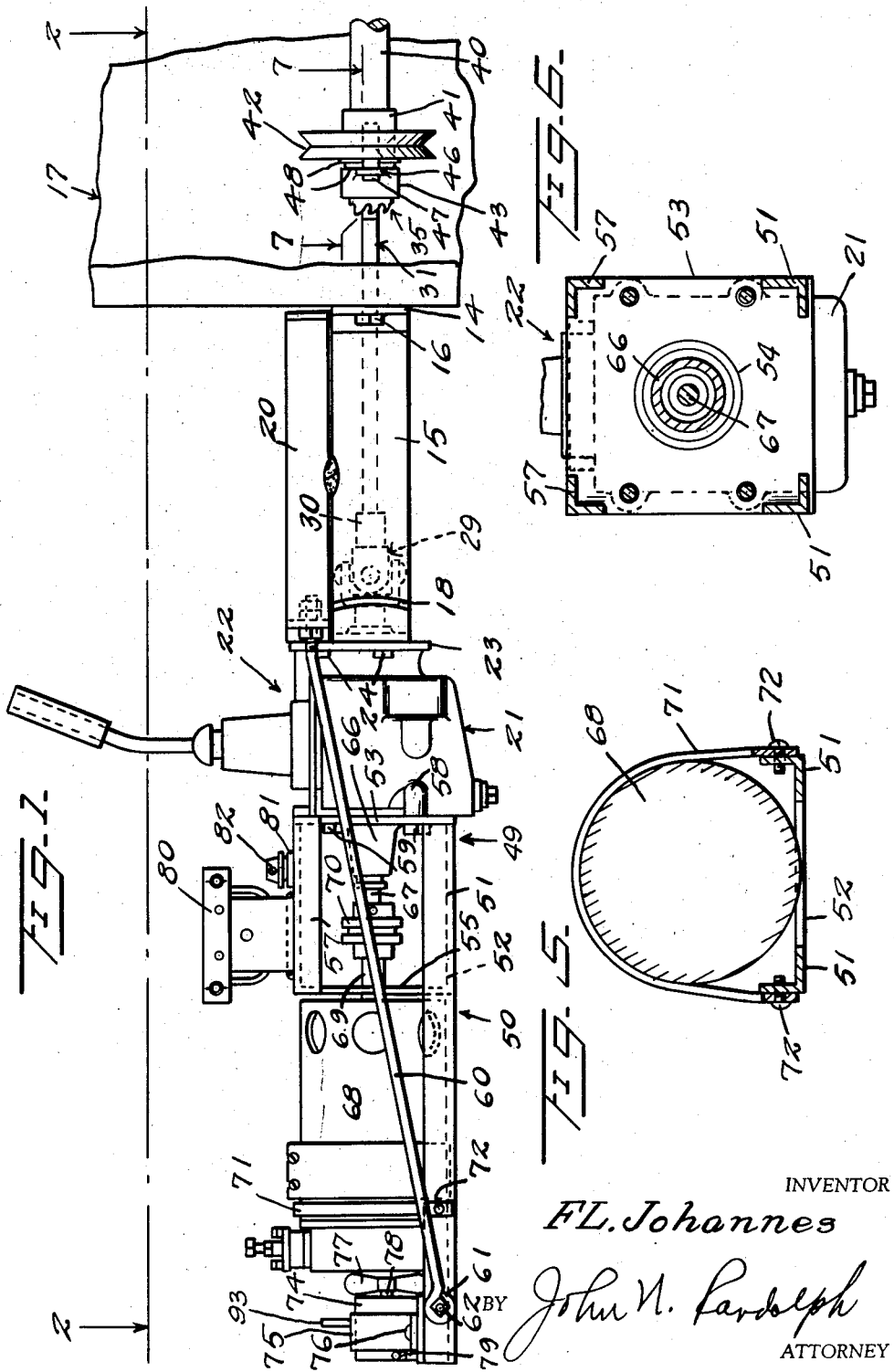

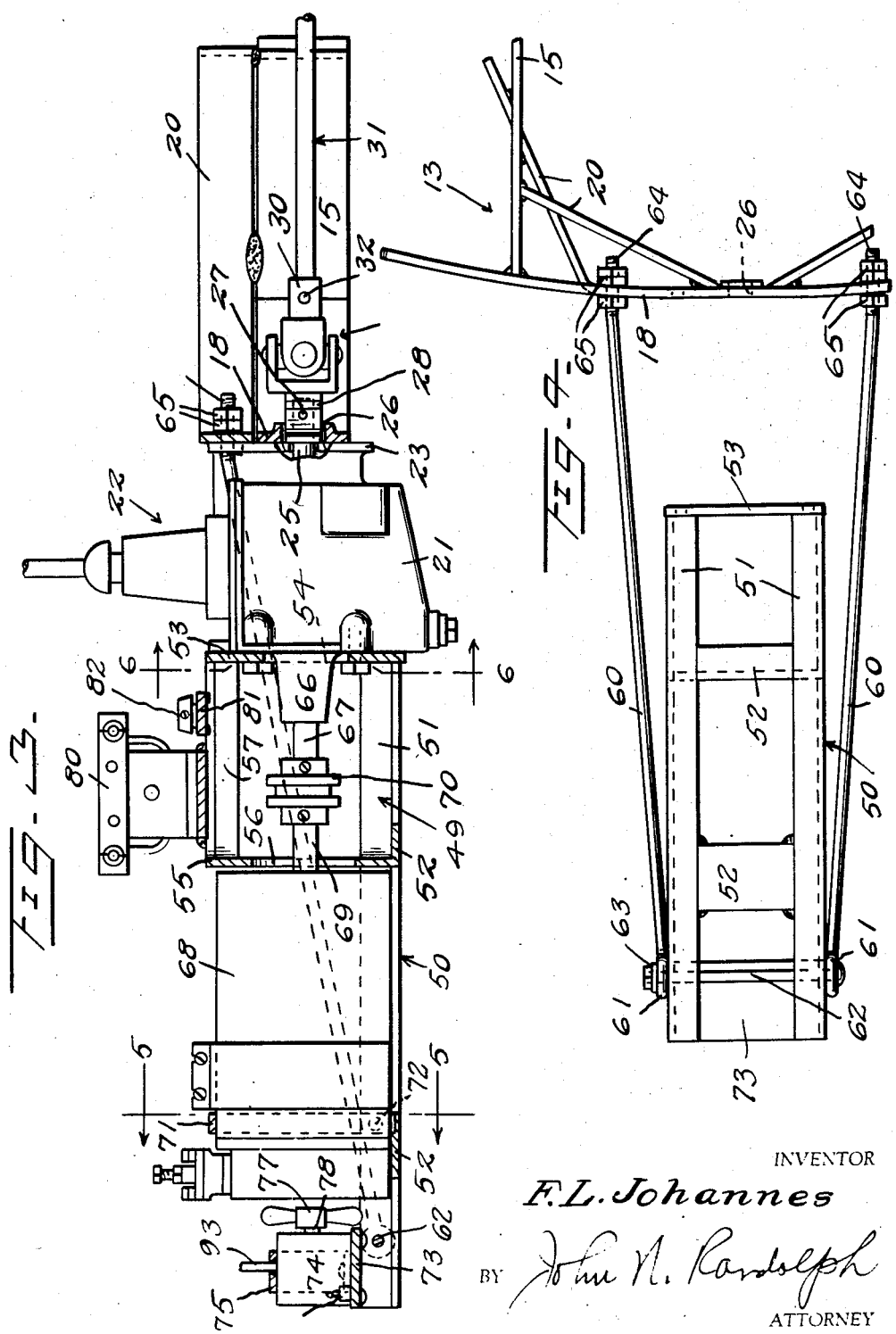

United States Patent Office 2,778,438
Patented Jan. 22, 1957

2,778,438

POWER TRANSMITTING ATTACHMENT FOR VEHICLES

Felix Lawrence Johannes, Dyersville, Iowa

Application May 12, 1954, Serial No. 429,179

3 Claims. (Cl. 180—53)

This invention relates to a novel attachment primarily adapted to be mounted on the end of a conventional tractor but which may be mounted on an end of other forms of motor driven vehicles such as trucks and automobiles.

It is a primary object of the present invention to provide a power transmitting attachment which may be readily mounted detachably on an end of a vehicle and readily coupled to the prime mover thereof whereby the attachment will be carried by and translationally moved with the vehicle and will be driven, when desired, by the prime mover of the vehicle to afford an available source of power for any particular work to be performed.

Still a further object of the invention is to provide an attachment of unique construction having novel means for supporting the attachment on an end of a vehicle and for coupling the driving means of the attachment to the vehicle's prime mover.

Various other objects and advantages of the invention will hereinafter become more fully apparent from the following description of the drawings, illustrating a presently preferred embodiment thereof, and wherein:

Figure 1 is a side elevational view showing the attachment in an applied position on the forward end of a vehicle, such as a tractor;

Figure 2 is a top plan view of the invention shown partially detached from the vehicle, taken substantially along a plane as indicated by the line 2—2 of Figure 1;

Figure 3 is a longitudinal sectional view, taken substantially along a plane as indicated by the line 3—3 of Figure 2;

Figure 4 is a fragmentary bottom plan view of a portion of the invention;

Figures 5 and 6 are enlarged cross sectional views taken substantially along planes as indicated by the lines 5—5 and 6—6, respectively, of Figure 3;

Figure 7 is an enlarged fragmentary sectional view taken substantially along a plane as indicated by the line 7—7 of Figure 1;

Figure 8 is a fragmentary cross sectional view taken substantially along a plane as indicated by the line 8—8 of Figure 7, and Figure 9 is a diagrammatic view illustrating one form of an electric circuit which may be utilized with the attachment.

Referring more specifically to the drawings, the power transmitting attachment in its entirety and comprising the invention is designated generally 12 and includes a combined vehicle bumper and support, designated generally 13, the inner end portions 14 of arms 15 of which are secured by suitable fastenings 16, as seen in Figure 1, to an end of a vehicle, designated generally 17. The arm ends 14 may be so spaced relatively to one another that the securing fastenings 16 thereof may readily replace the fastenings conventionally employed for mounting a conventional bumper, which the bumper and support 13 replaces. The bumper and support 13 also includes an outer combination bumper and support member 18 to which outer ends of the arms 15 are secured at 19. The bumper and support 13 also includes brace means 20 secured to the arms 15 and the bumper and support part 18.

In the embodiment of the invention as disclosed by the drawings, the power transmitting attachment 12 is adapted to be coupled to and supported in advance of the forward end of the vehicle 17. One end of the housing 21 of a conventional automobile transmission 22 is provided with a flange 23 which is disposed against the outer side of the intermediate portion of the bumper part 18 and secured rigidly thereto by fastenings 24. The input shaft 25 of the transmission 22 extends loosely through a large central opening 26 of the intermediate part of the bumper portion 18 and is disposed in and secured by a fastening 27 to a socket 28. The socket 28 constitutes one end of a universal joint 29 and is turnably disposed in the opening 26.

The universal joint 29 is disposed behind the intermediate part of the bumper portion 18 and has a socket 30 defining the opposite end thereof and which receives an end of a drive shaft 31. The shaft 31 is secured in the socket 30 by a shear pin 32. As best seen in Figures 7 and 8, the other end 33 of the shaft 31 is splined to fit in the splined socket 34 of a crank nut 35 whereby a splined connection is formed between the crank nut and shaft 31. The crank nut 35 has a stem 36 constituting its opposite end which extends through a hub wall 37 of a belt pulley 42 and into an outwardly opening socket 39 formed in the forward end of a vehicle crankshaft 40, on which forward end of said shaft 40 the hub 41 of the belt pulley 42 is secured.

A retaining collar 43 has a noncircular bore 44 in which the crank nut 35 non-turnably engages. As seen in Figure 8, the exterior surface 45 of the crank nut 35 is of noncircular cross section. The retaining collar 43 is provided with flanges 46 through which extend headed fastenings 47, which are secured in the pulley 42, whereby the crank nut 35 and shaft 31 will be caused to rotate with the crankshaft 40. Washers 48 are mounted on the crank nut stem 36 between the pulley wall 37 and the enlarged portion of the crank nut 35 to retain the pulley 42 against outward sliding movement on the crankshaft 40. It will be apparent that the drive shaft 31 will prevent the crank nut 35 from moving from right to left as seen in Figures 1 and 2, when said shaft 31 is coupled to the input shaft 25 by the universal joint 29 and the transmission 22 is secured to the bumper and support 13 and said bumper and support 13 is mounted on the forward end of the vehicle by the fastenings 16. Thus, the transmission input shaft 25 will be driven by the crankshaft 40 through the parts as previously described.

An elongated supporting frame, designated generally 49, includes a bottom, designated generally 50, as best seen in Figure 4, composed of two transversely spaced angle members 51 which are connected in spaced apart substantially parallel relationship by cross members 52 which are secured to both angle members 51. The supporting frame 49 includes an inner end wall 53 which is fixed to and rises from corresponding ends of the angle members 51 and which is provided with a relatively large central opening 54. A transverse wall 55 is fixed to the angle members 51 and extends upwardly therefrom and is located adjacent the inner end of the frame 49, as defined by the end wall 53. The wall 55 is likewise provided with a relatively large central opening 56. The frame 49 includes a top portion located adjacent the inner end only thereof and formed by two short angle members 57 which extend between and are secured at their ends to upper portions of the walls 53 and 55 and which are disposed in laterally spaced relationship to one another, as best seen in Figure 6.

The inner end wall 53 of the supporting frame 49 abuts against an opposite flange end 58 of the transmission housing 21 and is secured thereto by fastenings 59 for supporting the frame 49 beyond the transmission 22 and substantially in alignment therewith, as illustrated in Figures 1 and 2. The frame 49 is braced and supported adjacent its outer forward end by means of two brace rods 60 having eyes 61 at corresponding ends thereof. The shank of a headed bolt 62 extends through one eye 61, then through the vertical flanges of the frame members 51 and thereafter through the other eye 61. The shank end of the bolt 62 is threaded to receive a nut 63 which cooperates with the head of the bolt for securing the eyes 61 against opposite sides of the frame bottom 50, as best illustrated in Figure 4. As seen in Figures 1 and 4, the bolt 62 extends through the frame 49 near its outer forward end. The brace and support rods 60 extend in diverging relationship to one another from the bolt 62 and are inclined upwardly toward opposite threaded ends 64 thereof which extend through the front bumper part 18 adjacent its upper edge. Each threaded bolt end 64 carries a plurality of nuts 65 disposed on opposite sides of the bumper part 18 for adjustably securing the rods 60 thereto. Thus, the rods 60 effectively support the outer end of the frame 49.

The transmission case 21 includes a bearing 66 which extends through the wall opening 54 and in which is journaled the output shaft 67 of the transmission 22, which extends beyond the outer end of the bearing 66. A generator 68, of a conventional type, is mounted on and between portions of the longitudinal frame members 51 and is disposed beyond the transverse wall 55. The inner end of the generator 68 is located adjacent said wall 55 and the armature shaft 69 thereof projects from said end through the wall opening 56. Adjacent ends of the shafts 67 and 69 are connected by a suitable coupling 70. The generator 68 is retained in position on the frame bottom 50 by a strap member 71 which engages over the generator and is secured at its ends by fastenings 72 to the frame members 51.

A supporting plate 73 is disposed across and secured to the outer ends of the frame members 51 and provides a support for an electric fan motor 74 which is disposed on said plate and secured thereto by a strap member 75, which extends over the housing of the motor 74 and which is secured at its ends by fastenings 76 to the plate 73. A fan 77 is secured to the armature shaft 78 of the motor 74 and is disposed between said motor and the adjacent end of the generator 68 for directing a cooling draft of air longitudinally through the generator. The fan motor 74 is driven by the generator 68 and the electric circuit thereof includes a manual circuit making and breaking switch 79 which is mounted on the plate 73.

A conventional arc stabilizer 80 extends between and is secured to and supported on the upper frame members 57. A bar 81 bridges the upper frame members 57 and is secured thereto. A rheostat 82 is mounted on said bar 81. A resistor or resistors 83, illustrated in Figure 9, are disposed preferably within the inner end part of the frame 49.

Assuming that the power transmitting attachment 12 is to be utilized as a portable welder, welding cables 84 and 85 extend from positive and negative contacts 86 and 87, respectively, of the generator 68. The arc stabilizer 80 is interposed in the cable 84, as illustrated in the diagrammatic view Figure 9. A movable element of the rheostat 82 is connected to the contact 86 by a conductor wire 88 and a conductor wire 89 connects one end of the resistor 83 to a third contact 90 of the generator 68. Conductors 91 and 92 connect the ends of the resistor 83 to spaced points of the stationary part of the rheostat 82. The fan motor 74 is connected to the positive contact 86 of the generator 68 by an electrical conductor 93 and said motor 74 is grounded to the frame 49 by a conductor 94. Another conductor 95 is grounded to the frame 49 and is connected to the negative contact 87 of the generator to complete the electric circuit of the motor 74. The switch 79 is preferably interposed in the conductor 95. It is to be understood that the electric circuit as illustrated in Figure 9 is merely intended to illustrate one electric circuit which may be employed in utilizing the power transmitting attachment 12 as a portable welding unit.

It will be obvious that the attachment 12 is movable with the vehicle 17 on which it is mounted so that the welding unit may be moved to any location where a welding operation is to be accomplished. Thereafter, by operating the engine of the vehicle 17 of which the crankshaft 40 forms a part, the input shaft 25 will be driven as previously described and the transmission 22 may be placed in gear in a conventional manner so that its output shaft 67 will be driven for driving the armature shaft 69 for generating the electric current supplied through the welding cables 84 and 85. As previously stated, the fan 77 is driven for cooling the generator 68.

Obviously, other mechanisms may be supported on the outer part of the frame 49 in lieu of the generator and fan and to which rotary motion can be supplied, so that the power transmitting attachment 12 may be employed for numerous purposes.

Various modifications and changes are contemplated and may obviously be resorted to, without departing from the spirit or scope of the invention as hereinafter defined by the appended claims.

I claim as my invention:

1. In combination with a vehicle having an engine and a shaft rotatably driven by the engine, a power transmitting attachment comprising a combination bumper and support having an inner portion and an outer portion, fastenings detachably securing said inner portion against an end of the vehicle, a transmission including a housing having an inner side and an outer side, fastening elements detachably securing said inner side of the housing to the outer portion of the bumper and support for mounting the transmission on the outer side of said outer portion, said outer portion including an opening, said transmission having an input shaft extending inwardly therefrom loosely through said opening, a drive shaft forming a driving connection between the rotatably driven shaft and the input shaft, an elongated frame having an inner end and an outer end, fastening members securing the inner end of the frame to the outer side of the transmission housing, said frame extending from the transmission in a direction away from the bumper and support, a power supply means disposed on and secured to said frame, said power supply means including a shaft extending therefrom toward the transmission, said transmission having an output shaft extending from the housing toward said power supply means, and a coupling connecting said output shaft to the shaft of said power supply means.

2. In a power transmitting attachment as in claim 1, said frame including laterally spaced longitudinally extending side members, cross braces connecting said side members, and said inner end of the frame comprising an end wall secured to and rising from corresponding inner ends of the side members and being disposed against and secured to said outer side of the transmission housing, said end wall having an opening through which said output shaft loosely extends.

3. In a power transmitting attachment as in claim 2, said frame having a transverse wall fixed to and rising from said side members and spaced from said end wall, said transverse wall having an opening through which the shaft of said power supply means loosely extends, and rigid top members forming a part of the frame and extending between and secured to the end wall and transverse wall for bracing the frame.

References Cited in the file of this patent

UNITED STATES PATENTS

| | | |
|---|---|---|
| 1,235,719 | Newcomb et al | Aug. 7, 1917 |
| 1,271,683 | Elmberg | July 9, 1918 |
| 1,326,557 | Wilson | Dec. 30, 1919 |
| 1,399,738 | Bonelli | Dec. 13, 1921 |
| 1,401,157 | Korner | Dec. 27, 1921 |
| 1,648,128 | Jaeger | Nov. 8, 1927 |
| 1,772,247 | Forrester et al. | Aug. 5, 1930 |
| 1,820,855 | Whitehead | Aug. 25, 1931 |
| 2,244,063 | Hobart | June 3, 1941 |
| 2,379,940 | Van Vleck | July 10, 1945 |